(12) United States Patent
Karlekar et al.

(10) Patent No.: US 11,663,241 B2
(45) Date of Patent: May 30, 2023

(54) SYSTEM AND METHOD FOR CATALOG SERVICE

(71) Applicant: Nutanix, Inc., San Jose, CA (US)

(72) Inventors: Chaitanya Sudhir Karlekar, San Jose, CA (US); Constantine Kousoulis, San Jose, CA (US); Robert William Schwenz, Campbell, CA (US); Shashank Bipin Kumar, Vancouver (CA); Suraj Nagaraja Kasi, Santa Clara, CA (US)

(73) Assignee: Nutanix, Inc., San Jose, CA (US)

( * ) Notice: Subject to any disclaimer, the term of this patent is extended or adjusted under 35 U.S.C. 154(b) by 261 days.

(21) Appl. No.: 16/805,581

(22) Filed: Feb. 28, 2020

(65) Prior Publication Data
US 2021/0124765 A1 Apr. 29, 2021

Related U.S. Application Data

(60) Provisional application No. 62/926,378, filed on Oct. 25, 2019.

(51) Int. Cl.
| | | |
|---|---|---|
| G06F 16/20 | (2019.01) | |
| G06F 16/28 | (2019.01) | |
| G06F 9/455 | (2018.01) | |
| G06F 16/188 | (2019.01) | |
| G06F 16/13 | (2019.01) | |

(52) U.S. Cl.
CPC ........ *G06F 16/285* (2019.01); *G06F 9/45558* (2013.01); *G06F 16/13* (2019.01); *G06F 16/188* (2019.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 7,725,671 B2 | 5/2010 | Prahlad et al. | |
| 7,840,533 B2 | 11/2010 | Prahlad et al. | |
| 8,447,728 B2 | 5/2013 | Prahlad et al. | |
| 8,549,518 B1 | 10/2013 | Aron et al. | |
| 8,762,335 B2 | 6/2014 | Prahlad et al. | |
| 8,850,130 B1 | 9/2014 | Aron et al. | |
| 9,740,723 B2 | 8/2017 | Prahlad et al. | |
| 10,057,279 B1* | 8/2018 | Balduzzi | G06F 21/56 |
| 10,210,048 B2 | 2/2019 | Sancheti | |
| 10,248,657 B2 | 4/2019 | Prahlad et al. | |

(Continued)

OTHER PUBLICATIONS

Nutanix Inc., "Prism 5.5, Prism Central Guide" (Jul. 7, 2020) pp. 1-618.

(Continued)

*Primary Examiner* — Jau Shya Meng
(74) *Attorney, Agent, or Firm* — Foley & Lardner LLP

(57) ABSTRACT

An illustrative embodiment disclosed herein is an apparatus including a processor having programmed instructions to receive, from a client, a request to create a catalog item corresponding to a file, determine an identifier of a cluster manager associated with a cluster having available capacity, send, to the cluster manager, a source location of the catalog item, and cause the cluster manager to store the catalog item from the source location in the cluster.

21 Claims, 8 Drawing Sheets

(56) References Cited

U.S. PATENT DOCUMENTS

| | | | | |
|---|---|---|---|---|
| 2007/0022065 A1* | 1/2007 | Hatano | ................ | G06F 16/285 |
| | | | | 706/16 |
| 2007/0300221 A1* | 12/2007 | Hartz | .................... | G06F 3/1288 |
| | | | | 718/1 |
| 2009/0112881 A1* | 4/2009 | Kodama | ............... | G06F 16/176 |
| 2009/0228669 A1* | 9/2009 | Slesarev | ............... | G06F 3/0649 |
| | | | | 711/161 |
| 2014/0006350 A1* | 1/2014 | Fukui | .................... | G06F 16/178 |
| | | | | 707/632 |
| 2015/0039837 A1* | 2/2015 | Quan | ...................... | G06F 3/061 |
| | | | | 711/136 |
| 2016/0127307 A1* | 5/2016 | Jain | ........................ | G06F 3/065 |
| | | | | 709/245 |
| 2018/0275881 A1* | 9/2018 | Ashraf | .................... | G06F 3/065 |
| 2019/0005407 A1* | 1/2019 | Harris | .................... | G06F 16/355 |
| 2020/0097177 A1* | 3/2020 | Ashokkumar | ...... | G06F 9/45558 |

OTHER PUBLICATIONS

Nutanix, Inc. "Prism Central Guide", Acropolis 5.0, (Oct. 18, 2018), pp. 1-374.
Nutanix, Inc., "Acropolis Advance Administration Guide" Acropolis 5.0 Feb. 9, 2018, pp. 1-60.
Nutanix, Inc., "Acropolis Advanced Administration Guide" Acropolis 5.1, Jul. 11, 2018, pp. 1-63.
Nutanix, Inc., "Prism Central Guide", Acropolis 5.1, (Oct. 18, 2018), pp. 1-410.
Nutanix, Inc., "Prism Web Console Guide" Prism 5.8, (Mar. 19, 2019), pp. 1-808.

* cited by examiner

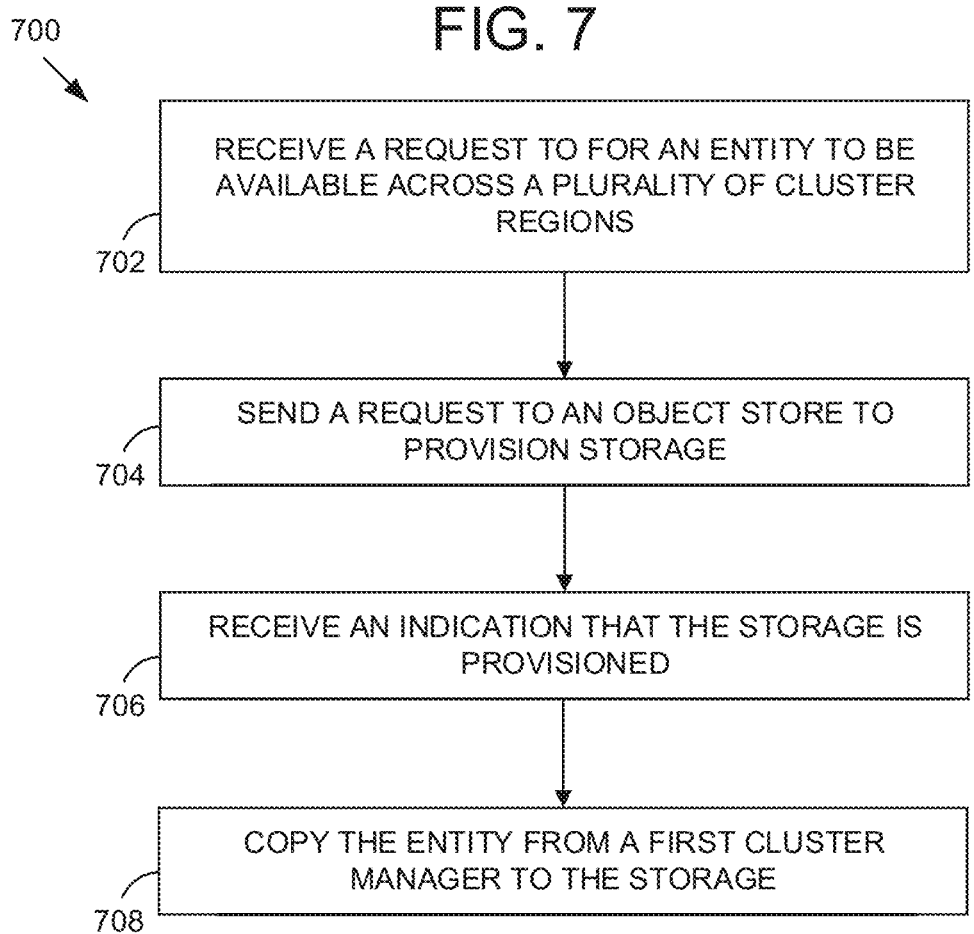

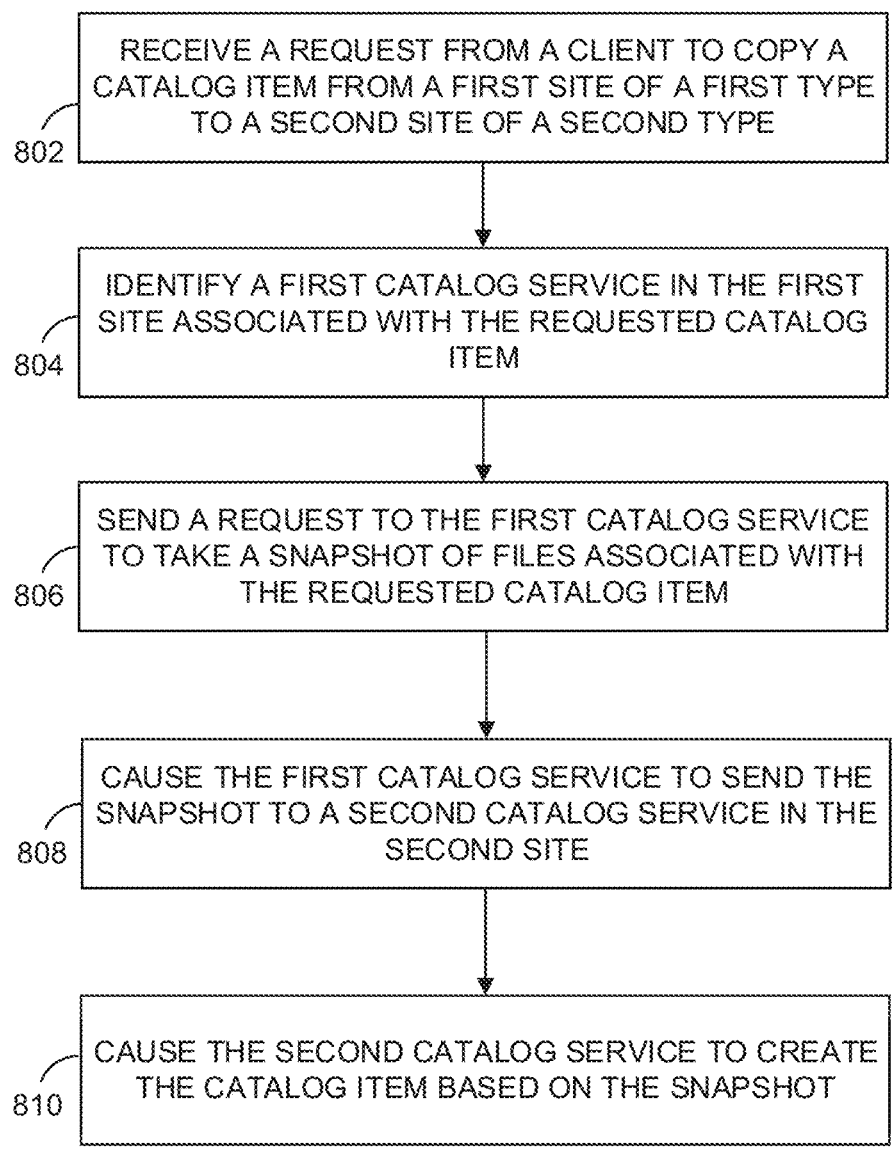

SYSTEM AND METHOD FOR CATALOG SERVICE

CROSS-REFERENCE TO RELATED APPLICATION

This application is related to and claims priority under 35 U.S. § 119(e) from U.S. Provisional Application No. 62/926,378, filed Oct. 25, 2019, titled "SYSTEM AND METHOD FOR CATALOG SERVICE," the entire contents of which are incorporated herein by reference for all purposes.

BACKGROUND

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present day virtual computing systems have limitations due to their configuration and the way they operate.

SUMMARY

Aspects of the present disclosure relate generally to a virtualization environment, and more particularly to a system and method for providing catalog services.

An illustrative embodiment disclosed herein is an apparatus including a processor having programmed instructions to receive, from a client, a request to create a catalog item corresponding to a file, determine an identifier of a cluster manager associated with a cluster having available capacity, send, to the cluster manager, a source location of the catalog item, and cause the cluster manager to store the catalog item from the source location in the cluster.

In some embodiments, the processor has further programmed instructions to send, to a scheduler, a second request to identify the cluster manager associated with the cluster having the available capacity and receive, from the scheduler, the identifier of the cluster manager. In some embodiments, the source location is a uniform resource locator (URL). In some embodiments, the processor has further programmed instructions to access a content server via the URL and download the catalog item. In some embodiments, the processor has further programmed instructions to store the file in a file repository and store a pointer to the file in the cluster.

In some embodiments, the processor has further programmed instructions to provision storage in an object store accessible by the cluster manager and store the file in the object store. In some embodiments, the source location is a location of a first cluster, and the cluster is a second cluster different from the first cluster. In some embodiments, the source location is a location of a public cloud, and the cluster is an on-premises cluster.

Another illustrative embodiment disclosed herein is a non-transitory computer readable storage medium having instructions stored thereon that, upon execution by a processor, causes the processor to perform operations including receiving, from a client, a request to create a catalog item corresponding to a file, determining an identifier of a cluster manager associated with a cluster having available capacity, sending, to the cluster manager, a source location of the catalog item, and causing the cluster manager to store the catalog item from the source location in the cluster.

Another illustrative embodiment disclosed herein is a computer-implemented method including receiving, by a processor and from a client, a request to create a catalog item corresponding to a file, determining, by the processor, an identifier of a cluster manager associated with a cluster having available capacity, sending, by the processor and to the cluster manager, a source location of the catalog item and causing, by the processor, the cluster manager to store the catalog item from the source location in the cluster.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 7 is a flow chart of an example method for provisioning multi-cluster storage, in accordance with some embodiments of the present disclosure.

FIG. 8 is a flow chart of an example method for performing remote copy, in accordance with some embodiments of the present disclosure.

Figure 1:
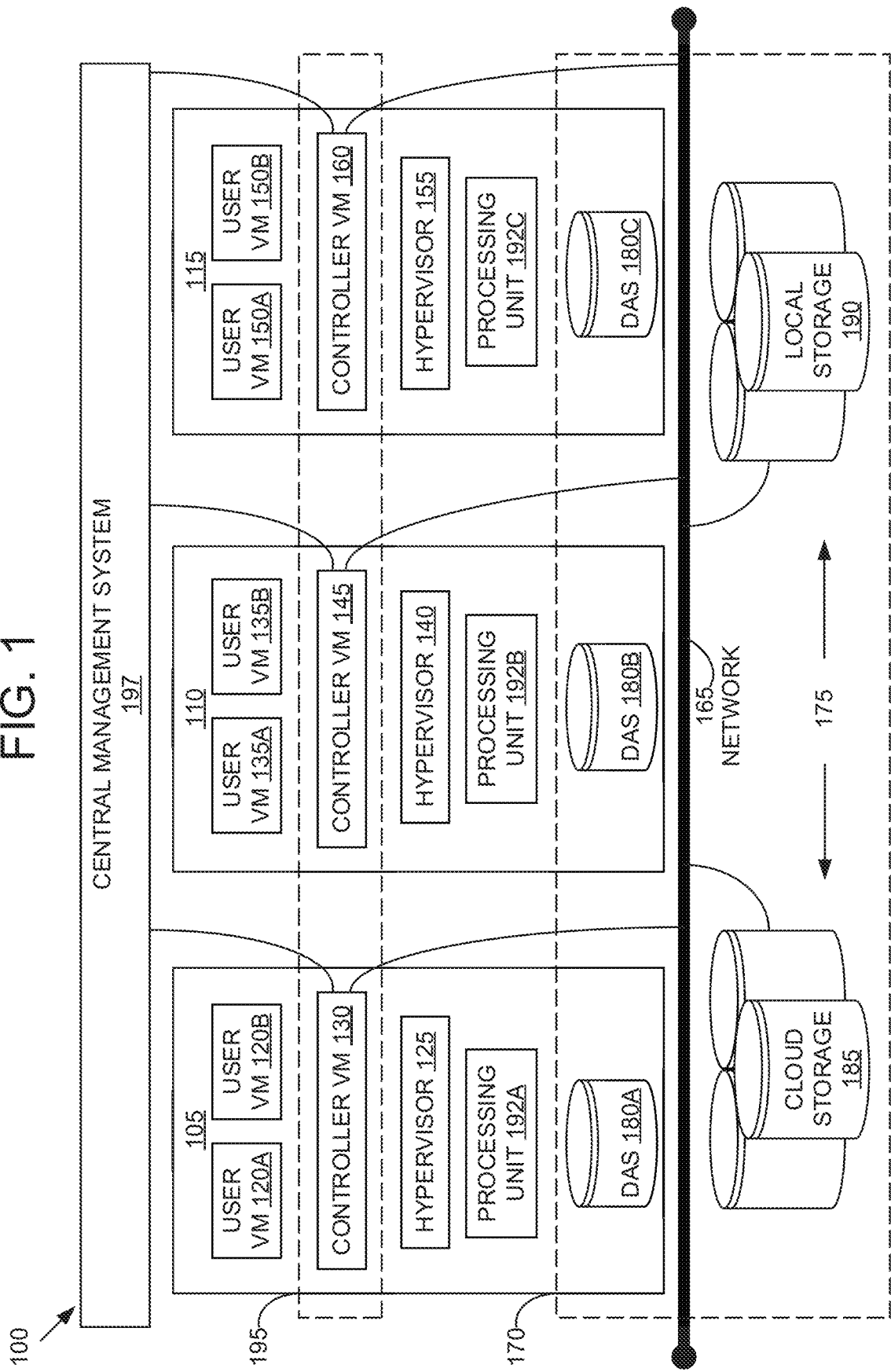
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

In conventional systems and methods, files, images, virtual machines (VMs), and other entities are created in a cluster of nodes. Entities are copied to additional clusters on-demand. However, as administrators, customers, and other users began managing higher numbers of clusters and need to spread the entities across the clusters, on-demand replication of entities became too slow, particularly if remote clusters can only be reached by narrow network links. Thus, copying an image from one cluster to another incurs high latency and high network bandwidth costs. Thus, there is a technical problem of making entities available across multiple clusters.

Moreover, conventional systems and methods do not allow copying catalog items such as images from on-premises to the cloud, or at least not without great difficulty. Thus, there is a technical problem of moving workloads between on-premises and cloud deployments and managing catalog items across both on-premises and the cloud.

Finally, in conventional systems and methods, the images bits are stored at the cluster manager. This results in latency and bandwidth bottlenecks between the user interface and cluster manager, as well as between the cluster manager and the multi-cluster manager. There exists a technical need to store entities such as images at an interface that exposes multiple clusters.

In some embodiments of the present disclosure, a multi-cluster catalog service manages images and other entities for improving performance and user experience. Entity services can migrate the entities to the catalog service. The catalog service can convert the entities created at a particular cluster to catalog items. The catalog service can select clusters to store the catalog items on based on available capacity. Other clusters can check out the catalog item to, for instance, copy an image or deploy a VM.

Sharing entities via the catalog service simplifies uploads and distribution across clusters. A user that has clusters spread over wide area network (WAN) link can incur minimal bandwidth or latency to copy image bits. Replication can be policy based or user based. The individual catalog item can be shared with other users, projects, and clusters. The catalog service can be integrated with an object store for storing the catalog items. Another advantage is that the catalog service can be part of a hybrid cloud. The catalog items can be moved or replicated between an on-premises system and any target cloud system. Another benefit is that the catalog items can be stored local to the catalog service, further ensuring low latency.

Virtualization Technology and Environment

Referring now to FIG. 1, a virtual computing system 100 is shown, in accordance with some embodiments of the present disclosure. The virtual computing system 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller VM 145, and the third node 115 includes user VMs 150A and 150B (collectively referred to herein as "user VMs 150"), a hypervisor 155, and a controller VM 160. The controller VM 130, the controller VM 145, and the controller VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage (NAS) 175 and direct-attached storage (DAS) 180A, 180B, and 180C (collectively referred to herein as DAS 180). The NAS 175 is accessible via the network 165 and, in some embodiments, may include cloud storage 185, as well as local storage area network 190 (also referred to as networked storage 190). In contrast to the NAS 175, which is accessible via the network 165, the DAS 180 includes storage components that are provided internally within each of the first node 105, the second node 110, and the third node 115, respectively, such that each of the first, second, and third nodes may access its respective DAS without having to access the network 165.

It is to be understood that only certain components of the virtual computing system 100 are shown in FIG. 1. Nevertheless, several other components that are needed or desired in the virtual computing system 100 to perform the functions described herein are contemplated and considered within the scope of the present disclosure.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller VM 130, the controller VM 145, and the controller VM 160, and/or the hypervisor 125, the hypervisor 140, and the hypervisor 155. One or more of the first node 105, the second node 110, and the third node 115 may be organized in a variety of network topologies.

Also, the first node 105 may include one or more processing units 192A, the second node 110 may include one or more processing units 192B, and the third node 115 may include one or more processing units 192C. The processing units 192A, 192B, and 192C are collectively referred to herein as the processing units 192. The processing units 192 may be configured to execute instructions. The instructions may be carried out by a special purpose computer, logic circuits, or hardware circuits of the first node 105, the second node 110, and the third node 115. The processing units 192 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units 192, thus, execute an instruction, meaning that they perform the operations called for by that instruction.

The processing units 192 may be operably coupled to the storage pool 170, as well as with other elements of the first node 105, the second node 110, and the third node 115 to receive, send, and process information, and to control the operations of the underlying first, second, or third node. The processing units 192 may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. The RAM may be stand-alone hardware such as RAM chips or modules. Further, each of the processing units 192 may include a single stand-alone processing unit, or a plurality of processing units that use the same or different processing technology.

With respect to the storage pool 170 and particularly with respect to the DAS 180, each of the DAS 180 may include a variety of types of memory devices. For example, in some embodiments, one or more of the DAS 180 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the NAS 175 may include any of a variety of network accessible storage (e.g., the cloud storage 185, the local storage area network 190, etc.) that is suitable for use within the virtual computing system 100 and accessible via the network 165. The storage pool 170, including the NAS 175 and the DAS 180, together form a distributed storage system configured to be accessed by each of the first node 105, the second node 110, and the third node 115 via the network 165, the controller VM 130, the controller VM 145, the controller VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller VM 130, the controller VM 145, and the controller VM 160. The controller VM 130, the controller VM 145, and the controller VM 160 are configured to communicate with each other via the network 165 to form a distributed system 195. Each of the controller VM 130, the controller VM 145, and the controller VM 160 may also include a local management system configured to manage various tasks and operations within the virtual computing system 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller VM 130, the controller VM 145, the controller VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. For example, a particular user VM (e.g., the user VMs 120, the user VMs 135, or the user VMs 150) may direct an input/output request to the controller VM (e.g., the controller VM 130, the controller VM 145, or the controller VM 160, respectively) on the underlying node (e.g., the first node 105, the second node 110, or the third node 115, respectively). Upon receiving the input/output request, that controller VM may direct the input/output request to the controller VM (e.g., one of the controller VM 130, the controller VM 145, or the controller VM 160) of the leader node. In some cases, the controller VM that receives the input/output request may itself be on the leader node, in which case, the controller VM does not transfer the request, but rather handles the request itself.

The controller VM of the leader node may fulfil the input/output request (and/or request another component within the virtual computing system 100 to fulfil that request). Upon fulfilling the input/output request, the controller VM of the leader node may send a response back to the controller VM of the node from which the request was received, which in turn may pass the response to the user VM that initiated the request. In a similar manner, the leader node may also be configured to receive and handle requests (e.g., user requests) from outside of the virtual computing system 100. If the leader node fails, another leader node may be designated.

Furthermore, one or more of the first node 105, the second node 110, and the third node 115 may be combined together to form a network cluster of nodes (referred to herein as "cluster"). Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

Additionally, in some embodiments the virtual computing system 100 includes a central management system 197 that is configured to manage and control the operation of the various clusters in the virtual computing system. In some embodiments, the central management system 197 may be configured to communicate with the local management systems on each of the controller VM 130, the controller VM 145, the controller VM 160 for controlling the various clusters.

Again, it is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Catalog Service

A file repository manages files and metadata about the files that is stored across multiple clusters. Each file can include, or be associated with, metadata such as a universally unique identifier (UUID), a name, a description, a checksum, a list of locations, opaque data, a snapshot, or a combination thereof. A catalog service, in some embodiments, is built on top of the file repository. In some embodiments, the catalog service manages metadata about location of files and manages physical copies of data across multiple clusters. The catalog service creates catalog items based on the files and deploys entities, such as images, VMs, containers, and applications, from the catalog items. In some embodiments, one or more catalog items maintained by the catalog service include at least one of data (e.g., file data) or file metadata. In some embodiments, the one or more catalog items include references (e.g., a pointers) to the file repository (e.g., a location in the file repository) where the files are located/stored/uploaded. In some embodiments, the one or more catalog items include at least one of the file metadata or the references to the data and the file repository includes the files. In some embodiments, the file metadata includes the references to the data.

Figure 2:
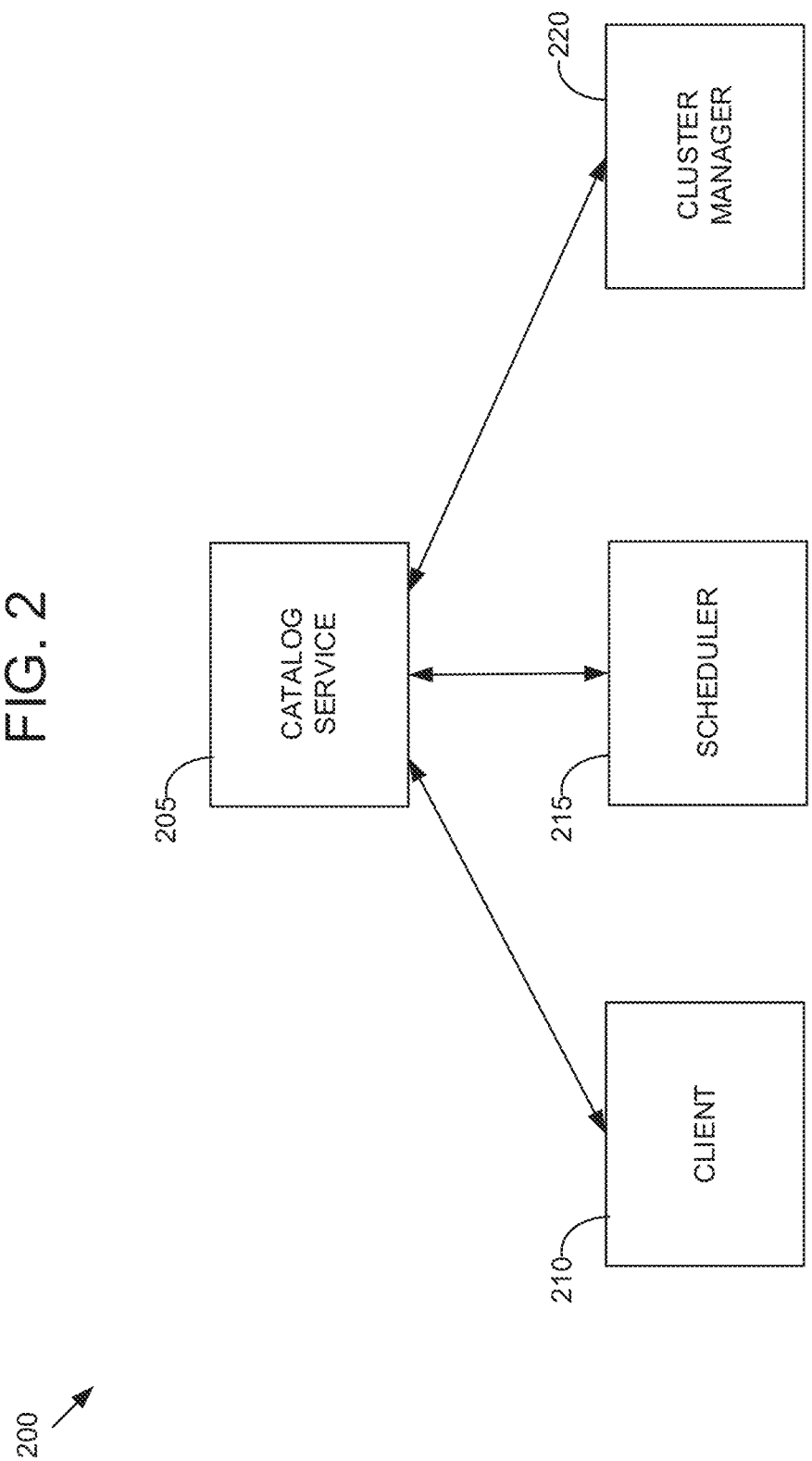
FIG. 2 is an example block diagram a catalog service environment, in accordance with some embodiments of the present disclosure.

Referring now to FIG. 2, an example block diagram of a catalog service environment 200 is shown, in accordance with some embodiments. The catalog service environment 200 includes a catalog service 205, a client 210 in communication with the catalog service 205, a scheduler 215 in communication with the catalog service 205, and a cluster manager 220 in communication with the catalog service 205. In some embodiments, the catalog service 205 is running on, or associated with, a multi-cluster manager such as the multi-cluster manager 405 with respect to FIG. 4, described below.

The catalog service 205 includes a processor having programmed instructions (herein, the catalog service 205 includes programmed instructions) to receive a request from the client 210 to create a catalog item, download the catalog item, add the catalog item to the catalog service 205, or otherwise process the catalog item, in some embodiments. The client 210, in some embodiments, is a user on a user device. In some embodiments, the client 210 interfaces with the catalog service 205 through a graphical user interface (GUI) of a webpage or desktop application (e.g., a portal). In some embodiments, the client 210 accesses the catalog service 205 and/or generates the request via a webpage on a web browser. In some embodiments, the catalog item is a an entity or reference to an entity. The entity can be a file, an image (e.g., a disk image or a file image), a virtual machine (VM), a service (e.g., life cycle management service), a VM state, a storage state, a service state, and the like. The file can be an image, a VM state, and the like.

In some embodiments, an entity service receives the catalog item request from the client 210 and forwards the catalog item request to the catalog service 205. For example, a request to create a VM is sent to a VM service that forwards the request to the catalog service 205. In another example, a request to create an image is sent to an image service or an image plug-in that forwards the request to the catalog service 205.

The catalog service 205 includes programmed instructions to determine an identifier or location of one or more cluster managers (e.g., the cluster manager 220). Each cluster manager is associated with a cluster. The cluster manager 220 provides management of its associated cluster. The cluster manager 220 can be accessible by a web browser. The cluster manager 220 can provide information on alerts, capacity, performance, health, and the like, of its associated cluster. The cluster manager 220 can manage VMs, storage, containers, servers, disks and networks on its associated cluster.

In some embodiments, the catalog service 205 includes programmed instructions to send a request to a scheduler 215 to identify the one or more cluster manager that are associated with one or more clusters, respectively. In some embodiments, the request is a request to identify all cluster managers. In some embodiments, the request is a request to identify cluster managers whose respective clusters meet one or more criteria. For example, a criterion may be that an available capacity of the cluster (e.g., a storage space in the cluster not already claimed by nodes/clusters/cluster managers) is greater than a pre-defined threshold. In some embodiments, a criterion may include a location of the cluster. In some embodiments, the catalog service 205 receives, from the scheduler an identifier or location of the one or more cluster managers. In some embodiments, the request includes a requested amount of storage, and the scheduler 215 provides one or more clusters that have an available amount of storage greater than the requested amount of storage.

The catalog service 205 includes programmed instructions to select a cluster manager 220. In some embodiments, the selection may be based on a location (e.g., geographic, logical) of the cluster manager 220 or the cluster managed by the cluster manager 220. In some embodiments, the selection may be based on whether the associated cluster has an available capacity greater than a pre-defined threshold, or whether a margin above the pre-defined threshold is greater than margins of other clusters. In some embodiments, the selection is user-based, system-based, manual, automated, or a combination thereof. In some embodiments, the catalog service 205 includes programmed instructions to send a request to the cluster manager 220 to create the catalog item or to manage the creation of the catalog item. In some embodiments, the cluster manager 220 creates the catalog item or manages the creation of the catalog item.

In some embodiments, the catalog item request includes a source location, e.g., a uniform resource locator (URL), a desktop or local computer file path, cluster location, an on-premises (on-prem) cluster location, a public cloud location, a public cloud server location, or other location where the catalog item is located. In some embodiments, the catalog service 205 receives the catalog item from the source location. In some embodiments, the catalog service 205 accesses a content server via the URL and downloads the catalog item (e.g., the image).

In some embodiments, the catalog service 205 or the cluster manager 220 stores the catalog item in storage associated with the catalog service 205 or the cluster manager 220. In some embodiments, the catalog service 205 receives, from the cluster manager 220, a reference to the catalog item (e.g., a handle, a location, a pointer, and the like) and stores the reference to the catalog item in storage or memory associated with the catalog service 205.

In one example, the client 210 sends a request to a VM service to add a VM to a catalog managed by the catalog service 205. The VM service calls a snapshot creator to first create a snapshot with a set of desired replica locations, in the example. The snapshot can include a VM snapshot, an image snapshot, a file snapshot, and the like. A snapshot can include details such as a disk image used to create a VM, a network configuration, and other data disks. After the snapshot is created, the VM service sends a request to the catalog service 205 to create a catalog item for the VM, in the example. If the client 210 did not specify any desired locations for the catalog item, then catalog service sends a request to the scheduler 215 to determine locations of cluster managers associated with available clusters, in the example. The catalog service 205 receives the locations and sends a request to one or more cluster managers to replicate data to one or more clusters associated with the one or more cluster managers, in the example. The catalog service 205 responds to the client 210, via the VM service, that the VM has been added to the catalog, in the example.

In another example, the client 210 sends a request to create an image to an image kind plugin. The image kind plug forwards the request to the catalog service 205, in the example. The catalog service 205 sends a request to the scheduler 215 to find a list of locations of possible cluster managers through which the image can be created and/or stored, in the example. The scheduler 215 responds with the list of possible locations, in the example. The catalog service 205 sends a source location (e.g., a website URL or file path) to a cluster manager 220 (e.g., to a catalog service instance associated with the cluster manager 220) from which to download the image (e.g., image bits), in the example. In some embodiments, the catalog service 205 wraps the image with additional metadata. The catalog service 205 sends the image to the cluster manager 220 to store the image on a cluster associated with the cluster manager 220, in the example. The catalog service 205 responds to the client 210 that the image is created, in the example.

Figure 3:
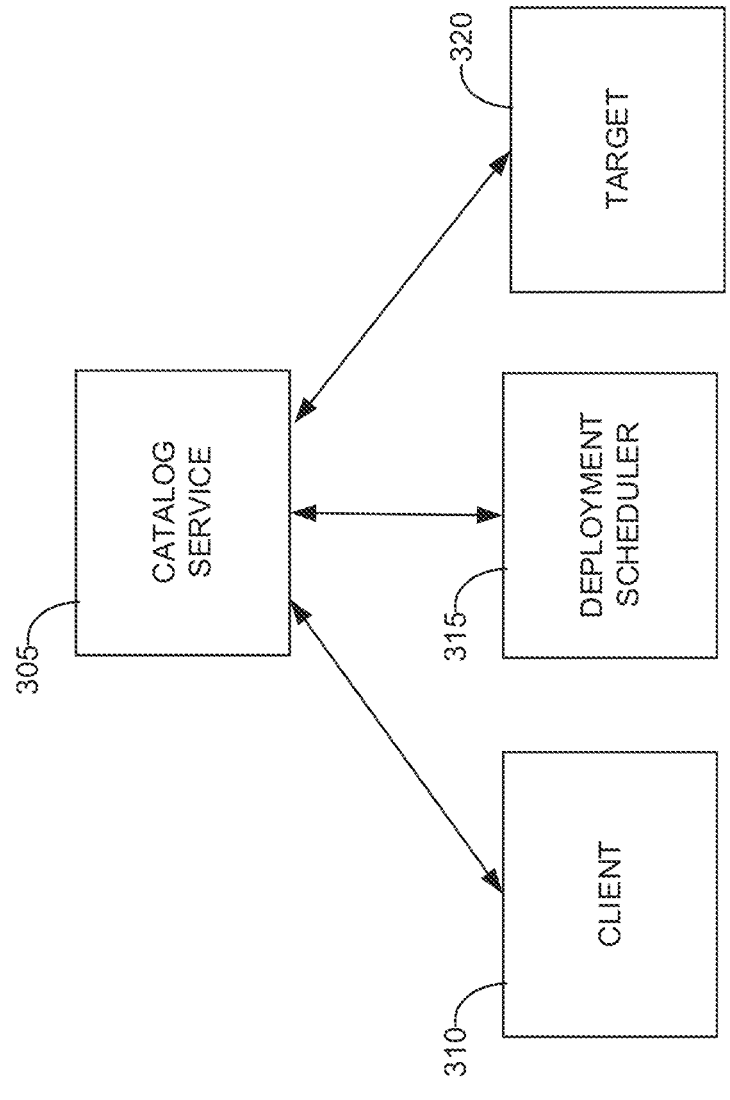
FIG. 3 is an example block diagram a catalog service environment, in accordance with some embodiments of the present disclosure.

Referring now to FIG. 3, an example block diagram of a catalog service environment 300 is shown, in accordance with some embodiments. The catalog service environment 300 includes a catalog service 305, a client 310 in communication with the catalog service 305, a deployment scheduler 315 in communication with the catalog service 305, and a target 320 in communication with the catalog service 305.

The catalog service 305 includes a processor having programmed instructions (herein, the catalog service 305 includes programmed instructions) to receive a request from a client 310 to deploy a catalog item. Without loss of generality, the remainder of FIG. 3 refers to deployment of a VM. In some embodiments, the catalog service 305 includes programmed instructions to identify VM metadata, including a state, a snapshot universally unique identifier (UUID), location information, or a combination thereof. In some embodiments, the catalog service 305 sends a request to a deployment scheduler 315 to determine a cluster to replicate or clone the VM. In some embodiments, the deployment scheduler 315 parses the UUID and location information to determine any constraints of cloning or migrating the VM. In some embodiments, the catalog service 305 receives an identifier of the cluster in which to replicate or clone the VM. In some embodiments, the catalog service 305 sends the VM metadata and the cluster identifier to a replication manager to cause the replication manager to clone or replicate the VM to the target 320 (e.g., the cluster associated with the cluster identifier). In some embodiments, the cluster identifier includes a plurality of cluster identifiers such that the replication manager clones or replicates to a plurality of clusters.

Figure 4:
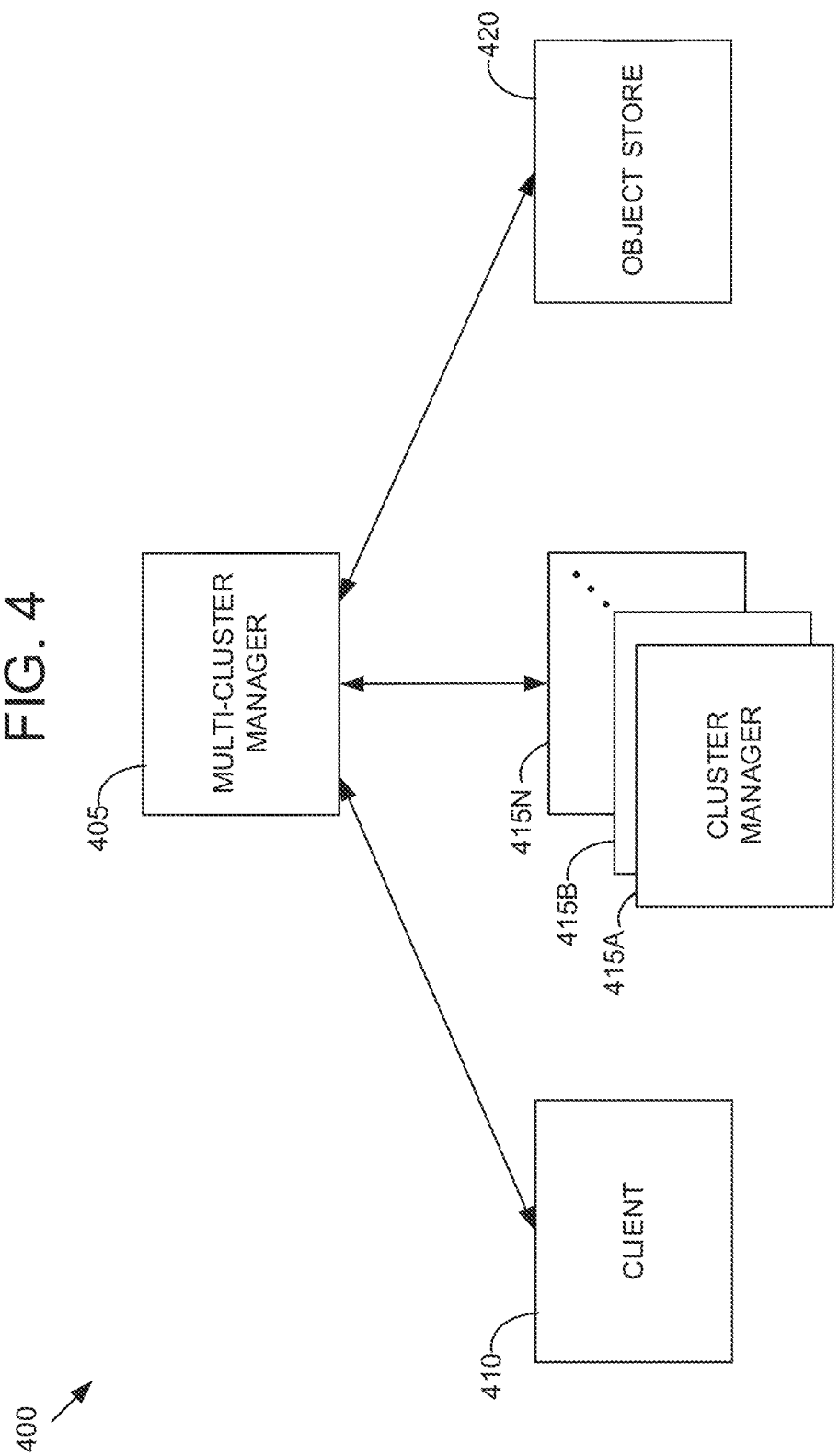
FIG. 4 is an example block diagram a multi-cluster environment, in accordance with some embodiments of the present disclosure.

Referring now to FIG. 4, an example block diagram of a multi-cluster environment 400 is shown, in accordance with some embodiments. The multi-cluster environment 400 includes a multi-cluster manager 405, a client 410 in communication with the multi-cluster manager 405, a cluster managers 415A-415N in communication with the multi-cluster manager 405, and the object store 420 in communication with the multi-cluster manager 405.

In some embodiments, the multi-cluster manager 405 includes a processor having programmed instructions (herein, the multi-cluster manager 405 includes programmed instructions) to receive a request from the client 410 to make one or more entities, files, or catalog items (e.g., images) available across multiple clusters and associated cluster regions (e.g., geographical or logical regions/locations). Each cluster region is associated with a cluster manager (e.g., one of the cluster managers 415A-415N). In some embodiments, the client 410 interfaces with the multi-cluster manager 405 through a graphical user interface (GUI) of a webpage or a desktop application (e.g., a portal).

In some embodiments, the multi-cluster manager 405 includes programmed instructions to send a request to the object store 420 to provision storage to be used or accessed by the multi-cluster manager 405. In some embodiments, the multi-cluster manager 405 includes programmed instructions to receive an indication from the object store 420 that the storage has been provisioned by the object store 420. In some embodiments, the request includes an amount of storage to be provisioned. The amount of storage to be provisioned may be based on an amount of the entities, files, or catalog items stored in any of the cluster regions (e.g., in the cluster managers 415A-415N or in the clusters associated with the cluster managers 415A-415N). In some embodiments, the indication includes an indication of the amount provisioned.

In some embodiments, the multi-cluster manager 405 includes programmed instructions to identify locations of the cluster regions. In some embodiments, the multi-cluster manager 405 includes programmed instructions to determine a storage location that satisfies a distance threshold relative to each of the cluster regions. In some embodiments, the multi-cluster manager 405 includes programmed instructions to determine an optimal location (e.g., geographic location) of the storage based on the locations of the cluster regions. In some embodiments, determining the optimal storage location includes finding a distance to each cluster region, finding an average distance (e.g., a sum of each of the distances divided by a number of the regions), and adjusting the storage location until the average distance is minimized. The request to the object storage may include the optimal storage location and the indication may include an indication that the provisioned storage is in the optimal location.

In some embodiments, the multi-cluster manager 405 includes programmed instructions to grant/permit/allow/give cluster managers 415A-515N access to the object store 420. In some embodiments, the multi-cluster manager 405 includes programmed instructions to copy (e.g., replicate, take snapshot of, clone, etc.) the entities, files, or catalog items from each of the cluster managers 415A-415N. In some embodiments, upon a subsequent request by the client to copy an entity, file, or catalog item from the cluster manager 415A to the cluster manager 415B, the multi-cluster manager 405 includes programmed instructions to copy the requested entity, file, or catalog item from the storage to the cluster manager 415B.

Figure 5:
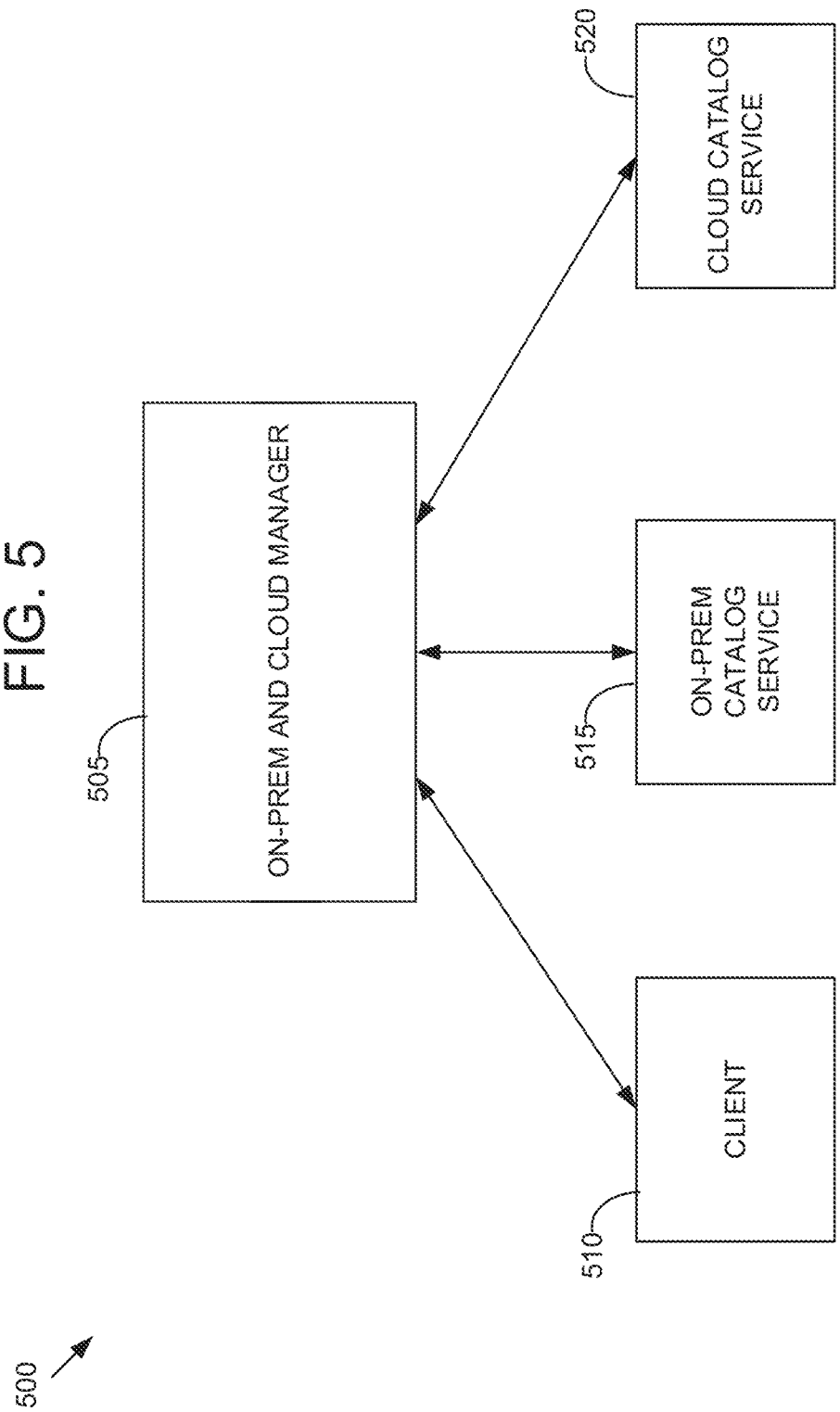
FIG. 5 is an example block diagram on-premises and cloud manager environment, in accordance with some embodiments of the present disclosure.

Referring now to FIG. 5, an example block diagram of an on-premises and cloud manager environment 500 is shown, in accordance with some embodiments. The on-premises (on-prem) and cloud manager environment 500 includes an on-prem and cloud manager 505, a client 510 in communication with the on-prem and cloud manager, an on-prem catalog service 515 in communication with the on-prem and cloud manager 505, and a cloud catalog service 520 in communication with the on-prem and cloud manager 505. The on-prem catalog service 515 manages catalog items in, or associated with, on-prem cluster (e.g., a datacenter) and the cloud catalog service 520 manages catalog items in, or associated with, a cloud (e.g., a cloud account).

In some embodiments, the on-prem and cloud manager 505 includes a processor having programmed instructions (herein, the on-prem and cloud manager 505 includes programmed instructions) to receive a request for one or more catalog items to be copied from the on-prem cluster to the cloud, or vice-versa. Copying from the on-prem cluster to the cloud, or vice-versa, is referred to as remote copy. Without loss of generality, herein is described copying from the on-prem cluster to the cloud. In some embodiments, the client 510 interfaces with the on-prem and cloud manager 505 through a graphical user interface (GUI) of a webpage or desktop application (e.g., a portal).

In some embodiments, the on-prem and cloud manager 505 includes programmed instructions to identify catalog services including or associated with files (e.g., data) of the requested catalog item. For example, the on-prem and cloud manager 505 determines that the on-prem catalog service 515 includes the files associated with the requested catalog item. In some embodiments, the on-prem and cloud manager 505 sends a request to the on-prem catalog service 515 to combine the files into one consistency group and take a snapshot (e.g., create a VM, image, or, more generally, files). A consistency group guarantees that a snapshot of the files are time consistent with each other.

In some embodiments, the on-prem catalog service 515 sends a permission request to the cloud catalog service 520 to permit the on-prem catalog service 515 to send (e.g., replicate and/or copy) the snapshot to the cloud catalog service 520. In some embodiments, the cloud catalog service 520 sends, to the on-prem catalog service 515, permission permitting the on-prem catalog service 515 is to send the snapshot to the cloud catalog service 520. In some embodiments, the on-prem catalog service 515 sends the snapshot to the cloud catalog service 520.

In some embodiments, cloud catalog service 520 creates or receives the catalog item (e.g., an active VM, active image, or, more generally, active files). In some embodiments, the cloud catalog service 520 uses the data and metadata in the snapshot to create the catalog item (e.g., to activate a static VM, a static image, or more generally, static files). In other embodiments, the catalog items are the snapshots (e.g., no activation is needed). In some embodiments, the catalog service 520 stores the catalog item in the cloud.

In some embodiments, the client 510 determines whether a lifecycle of the catalog item in the cloud (e.g., created by the cloud catalog service 520) is same as a lifecycle of the catalog item in the on-prem cluster (e.g., managed by the on-prem catalog service 515). In some embodiments, the client 510 determines a maximum amount of network bandwidth to be consumed by the two sites (e.g., the on-prem cluster and the cloud) when the on-prem catalog service 515 remotely copies the catalog item to the cloud catalog service 520. If the maximum amount of network bandwidth is to be exceeded, the remote copy is not performed. In some embodiments, the client 510 schedules a date and time at which the on-prem catalog service 515 is to remotely copy to the cloud catalog service 520.

Each of the entities or services of the environment 200 (e.g., the catalog service 205, the client 210, the scheduler 215, the cluster manager 220, or a combination thereof) the environment 300 (e.g., the catalog service 305, the client 310, the deployment scheduler 315, the target 320, or a combination thereof) the environment 400 (e.g., the multi-cluster manager 405, the client 410, the cluster managers 415A-415N, the object store 420, or a combination thereof), and the environment 500 (the on-prem and cloud manager 505, client 510, the on-prem catalog service 515, the cloud catalog service 520, or a combination thereof) is an apparatus, in some embodiments. The apparatus includes one or more processors (e.g., the processing unit 192A). The one or more processors are hardware or a combination of hardware and software, in some embodiments. The one or more processors have programmed instructions that, upon being executed, causes the apparatus to perform operations (e.g., read, write, send, receive, identify, determine, calculate, and the like). The programmed instructions are stored on non-transitory storage media (e.g., the storage pool 170), in some embodiments.

The catalog service 305, the on-prem catalog service 515, and the cloud catalog service 520 may be an instances of the catalog service 205. The client 310, the client 410, and the client 510 may be instances of the client 210. The cluster managers 415A-415N may be instances of the cluster manager 220.

Figure 6:
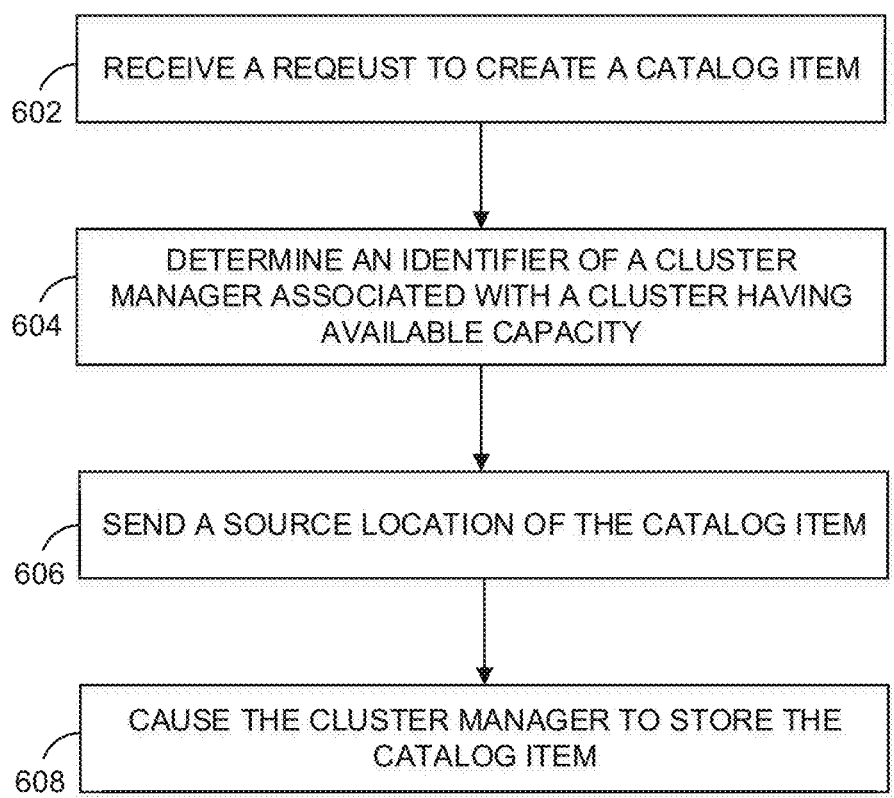
FIG. 6 is a flow chart of an example method for creating catalog items, in accordance with some embodiments of the present disclosure.

Referring now to FIG. 6, a flow chart of an example method 600 for creating catalog items is shown, in accordance with some embodiments. The method 600 may be implemented using, or performed by, one or more of the components of the virtual computing system 100, the catalog service environment 200, the catalog service environment 300, the multi-cluster manager environment 400, and the on-prem and the cloud manager environment 500, which are detailed herein with respect to FIG. 1, FIG. 2, FIG. 3, FIG. 4, and FIG. 5, respectively. The method 600 may be implemented using, or performed by, the catalog service 205 or a processor associated with the catalog service 205. Additional, fewer, or different operations may be performed in the method 600 depending on the embodiment.

A processor, such as a processor associated with the catalog service 205, receives a request to create a catalog item (602). The request may be from a client, such as the client 210, or based on a policy. The client can access the catalog service through a webpage on a web browser. The catalog item is a VM, an image, or a service, in some embodiments. The processor determines an identifier of a cluster having available capacity or cluster manager, such as the cluster manager 220, associated with the cluster having available capacity (604). In some embodiments, the processor sends, to a scheduler, such as the scheduler 215, a request to identify one or more clusters or one or more cluster managers each associated with a respective one of the one or more clusters. The one or more clusters have available capacity for storing the catalog item, in some embodiments. In some embodiments, the processor receives, from the scheduler, an identifier of the cluster or cluster manager associated with the cluster (604). The processor sends, to the cluster manager, a source location of the catalog item (606). In some embodiments, the source location is a URL associated with a content server. The processor causes the cluster manager to store the catalog item from the source location (608).

Referring now to FIG. 7, a flow chart of an example method 700 for provisioning multi-cluster storage is shown, in accordance with some embodiments. The method 700 may be implemented using, or performed by, one or more of the components of the virtual computing system 100, the catalog service environment 200, the catalog service environment 300, the multi-cluster manager environment 400, and the on-prem and cloud manager environment 500, which are detailed herein with respect to FIG. 1, FIG. 2, FIG. 3, FIG. 4, and FIG. 5, respectively. The method 700 may be implemented using, or performed by, the multi-cluster manager 405 or a processor associated with the multi-cluster manager 405. Additional, fewer, or different operations may be performed in the method 700 depending on the embodiment.

A processor, such as the processor associated with the multi-cluster manager 405, receives a request for an entity to be available across a plurality of cluster regions (702). The request may be from a client, such as the client 410 or based on a policy. The client can access the catalog service through a webpage on a web browser. The entity may be an image, a VM, a vdisk, a service, a file, a catalog item, or the like. The processor sends a request to an object store, such as the object store 420, to provision storage (704). The processor receives an indication from the object store that the storage is provisioned (706). The processor copies the entity from a cluster manager, such as the cluster manager 415A, that is associated with one of the cluster regions, to the storage (708).

Referring now to FIG. 8, a flow chart of an example method 800 for performing remote copy is shown, in accordance with some embodiments. The method 800 may be implemented using, or performed by, one or more of the components of the virtual computing system 100, the catalog service environment 200, the catalog service environment 300, the multi-cluster manager environment 400, and the on-prem and cloud manager environment 500, which are detailed herein with respect to FIG. 1, FIG. 2, FIG. 3, FIG. 4, and FIG. 5, respectively. The method 800 may be implemented using, or performed by, the on-premises (on-prem) and cloud manager 505 or a processor associated with the on-prem and cloud manager 505. Additional, fewer, or different operations may be performed in the method 800 depending on the embodiment.

A processor, such as the processor associated with the on-prem and cloud manager 505, receives, from a client such as the client 510, a request for one or more catalog items to be copied from a first site to a second site (802). In some embodiments, the first site is of a first site type (e.g. an on-prem cluster) and the second site is of a second site type (e.g., a cloud). In some embodiments, the client determines (e.g., selects) whether a lifecycle of the catalog item in the second site is same as a lifecycle of the catalog item in the first site. In some embodiments, the client determines a maximum amount of network bandwidth to be consumed by the two sites when a catalog service of the first site remotely copies the catalog item to a catalog service of the second site. If the maximum amount of network bandwidth is to be exceeded, the remote copy is not performed. In some embodiments, the client schedules a date and time at which the catalog service of the first site is to remotely copy to the catalog service of the second site.

The processor identifies catalog services (e.g., a first catalog service, such as the on-prem catalog service 515) in the first site associated with the requested catalog item (804). In some embodiments, the processor identifies catalog services including or associated with files (e.g., data) of the requested catalog item. The processor sends a request to the first site catalog service to take a snapshot of the files associated with the catalog item (806). In some embodiments, the processor sends a request to the first site catalog service to combine the files into one consistency group before taking the snapshot.

The processor causes the first site catalog service to send the snapshot to a second site catalog service, such as the cloud catalog service 520 (808). In some embodiments, the first site catalog service sends a permission request to the second site catalog service to permit the first site catalog service to send the snapshot to the second site catalog service. In some embodiments, the second site catalog service sends, to the first site catalog service, permission permitting the first site catalog service is to send the snapshot to the second site catalog service. The processor causes the second site catalog service to create the catalog item based on the snapshot (810).

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. An apparatus including a processor and a memory to store programmed instructions, the instructions executed by the processor to:
   receive a request to create a catalog item corresponding to a virtual machine or disk image, wherein the request is from a client or based on a policy;
   generate a snapshot of the virtual machine or disk image;
   determine a storage location derived from the request, wherein the storage location is in a cluster associated with a cluster manager, wherein the storage location is determined based on a distance between the cluster and a plurality of other clusters being less than a distance threshold;
send, to the cluster manager, a source location of the snapshot; and
cause the cluster manager to store the snapshot from the source location in the storage location.

2. The apparatus of claim 1, the memory to store further programmed instructions to:
send, to a scheduler, a second request to identify the cluster manager derived from the request; and
receive, from the scheduler, an identifier of the cluster manager.

3. The apparatus of claim 1, wherein the source location is a uniform resource locator (URL), the memory to store further programmed instructions to:
access a content server via the URL; and
download the virtual machine or disk image.

4. The apparatus of claim 1, the memory to store further programmed instructions to:
store the virtual machine or disk image in a file repository; and
store a pointer to the virtual machine or disk image in the storage location.

5. The apparatus of claim 1, the memory to store further programmed instructions to:
provision storage in an object store accessible by the cluster manager; and
store the file in the object store.

6. The apparatus of claim 1, wherein the source location is a location of a first cluster, and the storage location is a second cluster different from the first cluster.

7. The apparatus of claim 1, wherein the source location is a location of a public cloud, and the storage location is an on-premises cluster.

8. A non-transitory computer readable storage medium comprising instructions stored thereon that, upon execution by a processor, cause the processor to:
receive a request to create a catalog item corresponding to a virtual machine or disk image, wherein the request is from a client or based on a policy;
generate a snapshot of the virtual machine or disk image;
determine a storage location derived from the request, wherein the storage location is in a cluster associated with a cluster manager, wherein the storage location is determined based on a distance between the cluster and a plurality of other clusters being less than a distance threshold;
send, to the cluster manager, a source location of the snapshot; and
cause the cluster manager to store the snapshot from the source location in the storage location.

9. The medium of claim 8, comprising the instructions stored thereon that, upon execution by the processor, further cause the processor to:
send, to a scheduler, a second request to identify the cluster manager derived from the request; and
receive, from the scheduler, an identifier of the cluster manager.

10. The medium of claim 8, wherein the source location is a uniform resource locator (URL), comprising the instructions stored thereon that, upon execution by the processor, further cause the processor to:
access a content server via the URL; and
download the virtual machine or disk image.

11. The medium of claim 8, comprising the instructions stored thereon that, upon execution by the processor, further cause the processor to:
store the virtual machine or disk image in a file repository; and
store a pointer to the virtual machine or disk image in the storage location.

12. The medium of claim 8, comprising the instructions stored thereon that, upon execution by the processor, further cause the processor to:
provision storage in an object store accessible by the cluster manager; and
store the file in the object store.

13. The medium of claim 8, wherein the source location is a location of a first cluster, and the storage location is a second cluster different from the first cluster.

14. The medium of claim 8, wherein the source location is a location of a public cloud, and the storage location is an on-premises cluster.

15. A computer-implemented method comprising:
receiving, by a processor, a request to create a catalog item corresponding to a virtual machine or disk image, wherein the request is from a client or based on a policy;
generating a snapshot of the virtual machine or disk image;
determining, by the processor, a storage location derived from the request, wherein the storage location is in a cluster associated with a cluster manager, wherein the storage location is determined based on a distance between the cluster and a plurality of other clusters being less than a distance threshold;
sending, by the processor and to the cluster manager, a source location of the snapshot; and
causing, by the processor, the cluster manager to store the snapshot from the source location in the storage location.

16. The method of claim 15, further comprising:
sending, to a scheduler, a second request to identify the cluster manager derived from the request; and
receiving, from the scheduler, an identifier of the cluster manager.

17. The method of claim 15, wherein the source location is a uniform resource locator (URL), the method further comprising:
accessing a content server via the URL; and
downloading the virtual machine or disk image.

18. The method of claim 15, further comprising:
storing the virtual machine or disk image in a file repository; and
storing a pointer to the virtual machine or disk image in the storage location.

19. The method of claim 15, further comprising:
provisioning storage in an object store accessible by the cluster manager; and
storing the file in the object store.

20. The method of claim 15, wherein the source location is a location of a first cluster, and the storage location is a second cluster different from the first cluster.

21. The method of claim 15, wherein the source location is a location of a public cloud, and the storage location is an on-premises cluster.

* * * * *